(12) United States Patent
Neri et al.

(10) Patent No.: US 6,620,867 B1
(45) Date of Patent: Sep. 16, 2003

(54) CRYSTALLINE MODIFICATION OF MIXTURES OF A NICKEL-QUENCHER AND A BENZOPHENONE AND PROCESS FOR ITS PREPARATION

(75) Inventors: Carlo Neri, San Donato Milanese (IT); Luciano Pallini, San Giuliano Milanese (IT); Giovanni Sandre, San Donato Milanese (IT)

(73) Assignee: Great Lakes Chemical (Europe) GmbH, Frauenfeld (CH)

( * ) Notice: Subject to any disclaimer, the term of this patent is extended or adjusted under 35 U.S.C. 154(b) by 0 days.

(21) Appl. No.: 09/673,683

(22) PCT Filed: Apr. 23, 1999

(86) PCT No.: PCT/EP99/02799

§ 371 (c)(1),
(2), (4) Date: Dec. 19, 2000

(87) PCT Pub. No.: WO99/55768

PCT Pub. Date: Nov. 4, 1999

(30) Foreign Application Priority Data

Apr. 23, 1998 (IT) ......................... MI98A0863

(51) Int. Cl.$^7$ .............. C08K 5/46; C08K 5/13
(52) U.S. Cl. .......... 524/83; 524/328; 252/400 R; 252/402; 252/403
(58) Field of Search ............... 524/83, 328; 252/400 R, 252/402, 403

(56) References Cited

U.S. PATENT DOCUMENTS

| 4,097,454 A | 6/1978 | Tozzi et al. ........ 260/45.75 NQ |
| 4,734,449 A | * 3/1988 | Gugumus .................... 524/328 |
| 6,403,679 B1 | * 6/2002 | Neri et al. .................... 524/83 |

FOREIGN PATENT DOCUMENTS

| DE | 1669591 | 8/1971 | |
| EP | 0 214 507 A2 | * 3/1987 | |
| EP | 0 255 743 A1 | 2/1988 | ......... C07C/69/732 |
| EP | 0 514 784 A1 | 11/1992 | ............ C08K/5/13 |
| EP | 0 565 184 A1 | * 10/1993 | |
| WO | WO 98/46342 | 10/1998 | .............. B01J/2/00 |

* cited by examiner

*Primary Examiner*—Margaret Medley
(74) *Attorney, Agent, or Firm*—Michael W. Ferrell

(57) ABSTRACT

Crystalline modification of mixtures comprising (a) a nickel-quencher corresponding to [2,2'-thio-bis(4-t-octylphenolate)-n-butylamine Nickel (II)] and (b) a 2-hydroxy-4-alkyloxybenzophenone corresponding to 2-hydroxy-4-n-octyloxybenzophenone wherein it has two diffraction lines at angles 2ø=6.291 and 2ø=6.888 in the X-Ray diffraction spectrum from powders. The said crystalline modification can be used as a light stabilizer for agricultural films based on polyolefins or polyolefinic copolymers.

9 Claims, 5 Drawing Sheets

Figure 1:
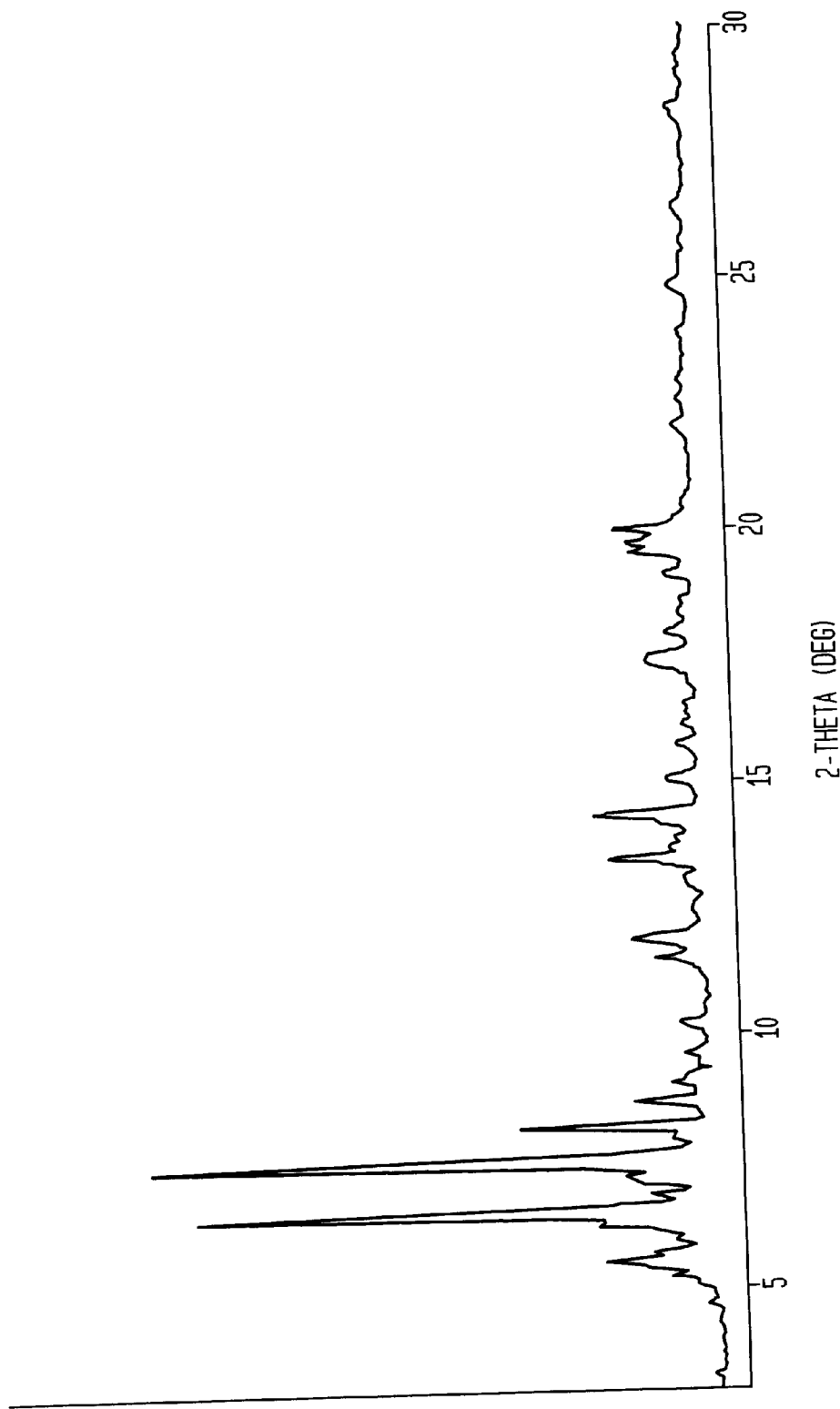

CRYSTALLINE MODIFICATION OF MIXTURES OF A NICKEL-QUENCHER AND A BENZOPHENONE AND PROCESS FOR ITS PREPARATION

The present invention relates to a crystalline modification of mixtures of a nickel-quencher and a benzophenone.

More specifically, the present invention relates to a crystalline modification of mixtures of a nickel-quencher corresponding to [2,2'-thiobis(4-t-octylphenolate)-n-butylamine Nickel (II)] and a 2-hydroxy-4-alkyloxybenzophenone corresponding to 2-hydroxy-4-n-octyloxybenzophenone, a process for its preparation and its use as a light stabilizer for agricultural films based on polyolefins or polyolefinic copolymers.

The present invention also relates to agricultural films based on polyolefins or polyolefinic copolymers stabilized with the above crystalline modification and greenhouses covered with these films.

Nickel-quenchers are at present sold in fine powder form and their use causes problems of environmental pollution, health and the safety of the operators in the feeding and handling phase.

A benzophenone is also generally used in the stabilization of agricultural films, together with nickel-quenchers.

Conventional methods for obtaining a physical form of nickel-quencher with a low powder content (for example, compaction of the powders under pressure) tested on both the nickel-quencher alone, and on mixtures of nickel-quenchers and benzophenones, have proved to be inapplicable or have not given satisfactory results.

The Applicant has now found a crystalline modification of mixtures of a nickel-quencher and a benzophenone capable of overcoming the drawbacks of the known art.

The present invention therefore relates to a crystalline modification of mixtures comprising:

(a) a nickel-quencher corresponding to [2,2'-thiobis(4-t-octyl-phenolate)-n-butylamine Nickel (II)] having formula (I):

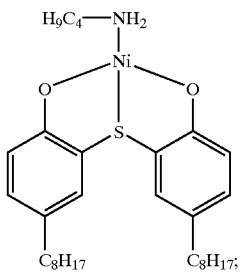

(b) a 2-hydroxy-4-alkyloxybenzophenone corresponding to the 2-hydroxy-4-n-octyloxybenzophenone having formula (II):

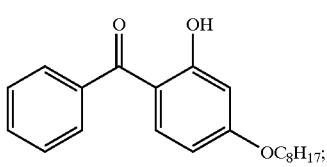

characterized in that it has two diffraction lines at angles 2θ=6.291 and 2θ=6.888 in the X-Ray diffraction spectrum from powders.

The X-Ray diffraction spectrum from powders is carried out using Cu—$K_\alpha$ radiation ($\lambda$=1.54178).

In the crystalline modification of the present invention, the nickel-quencher (a) having formula (I) and the benzophenone (b) having formula (II), are used in a ratio ranging from 0.4 to 3, preferably in a ratio ranging from 1 to 2.

The nickel-quencher (a) having formula (I) is known under the following trade-names: Cyasorb UV 1084 of Cytec, or Chimassorb N-705 of Ciba.

The benzophenone (b) having formula (II) is known under the following trade-names: Lowilite 22 of Great Lakes, Chimassorb 81 of Ciba, or Cyasorb UV 531 of Cytec.

The crystalline modification of the present invention can be obtained, for example, with a process comprising the extrusion of a mixture of powders of the two components, operating at such a temperature that only a small part of the benzophenone (b), having a melting point of 47° C.–50° C., melts and dissolves only a small part of the nickel-quencher (a), having a melting point>260° C.

A solid "spaghetto" is thus obtained which, after appropriate cooling, can be granulated by cutting at the head of the extruder or by subsequent fragmentation.

The molten part of the benzophenone (b) and the part of the nickel-quencher (a) dissolved therein, on resolidifying, act as a binder for the remaining components, benzophenone (b) and nickel-quencher (a), which are still in powder form: in this way the solid "spaghetto" is obtained, which is subsequently cooled and cut as described above.

Figure 2:
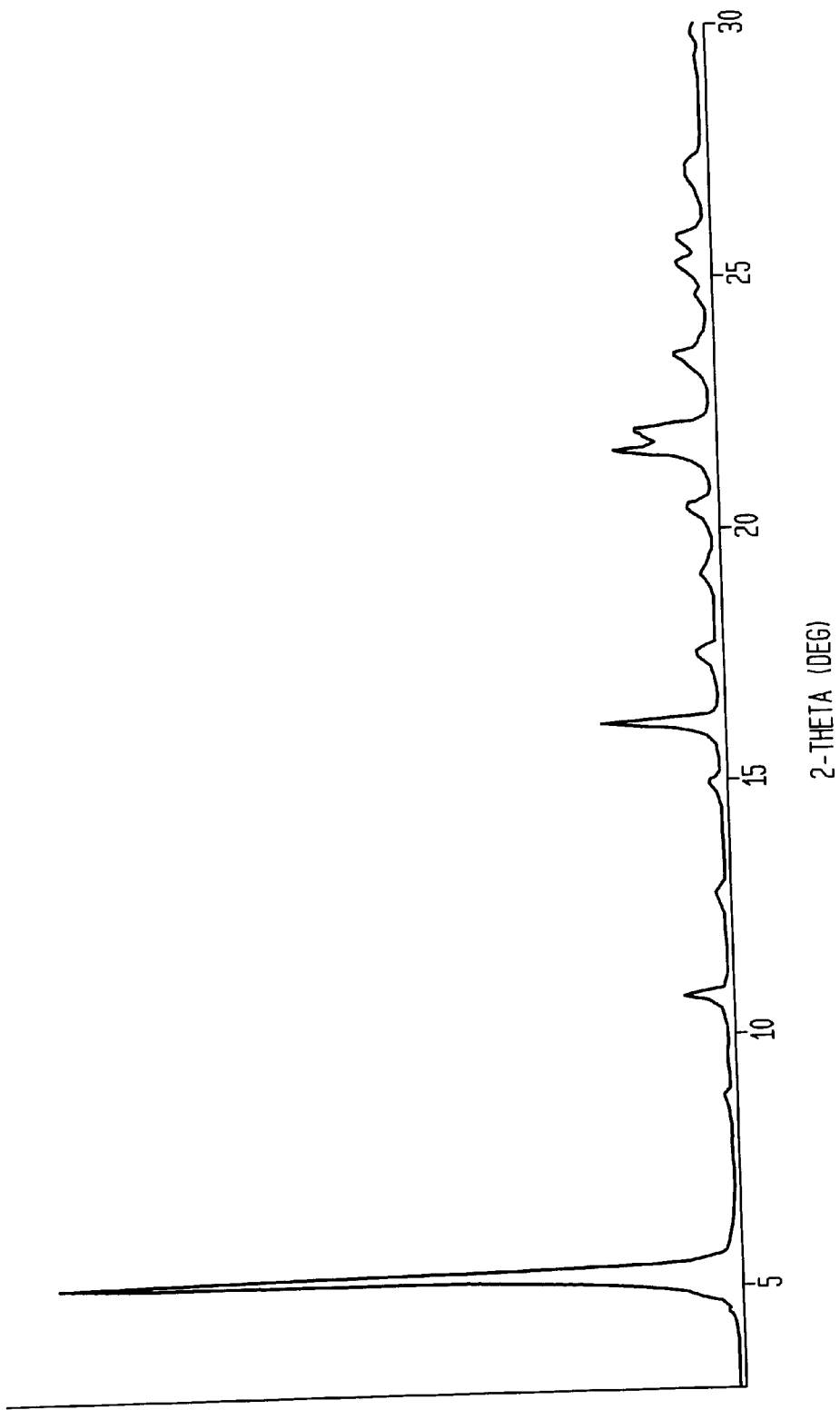
Figure 3:
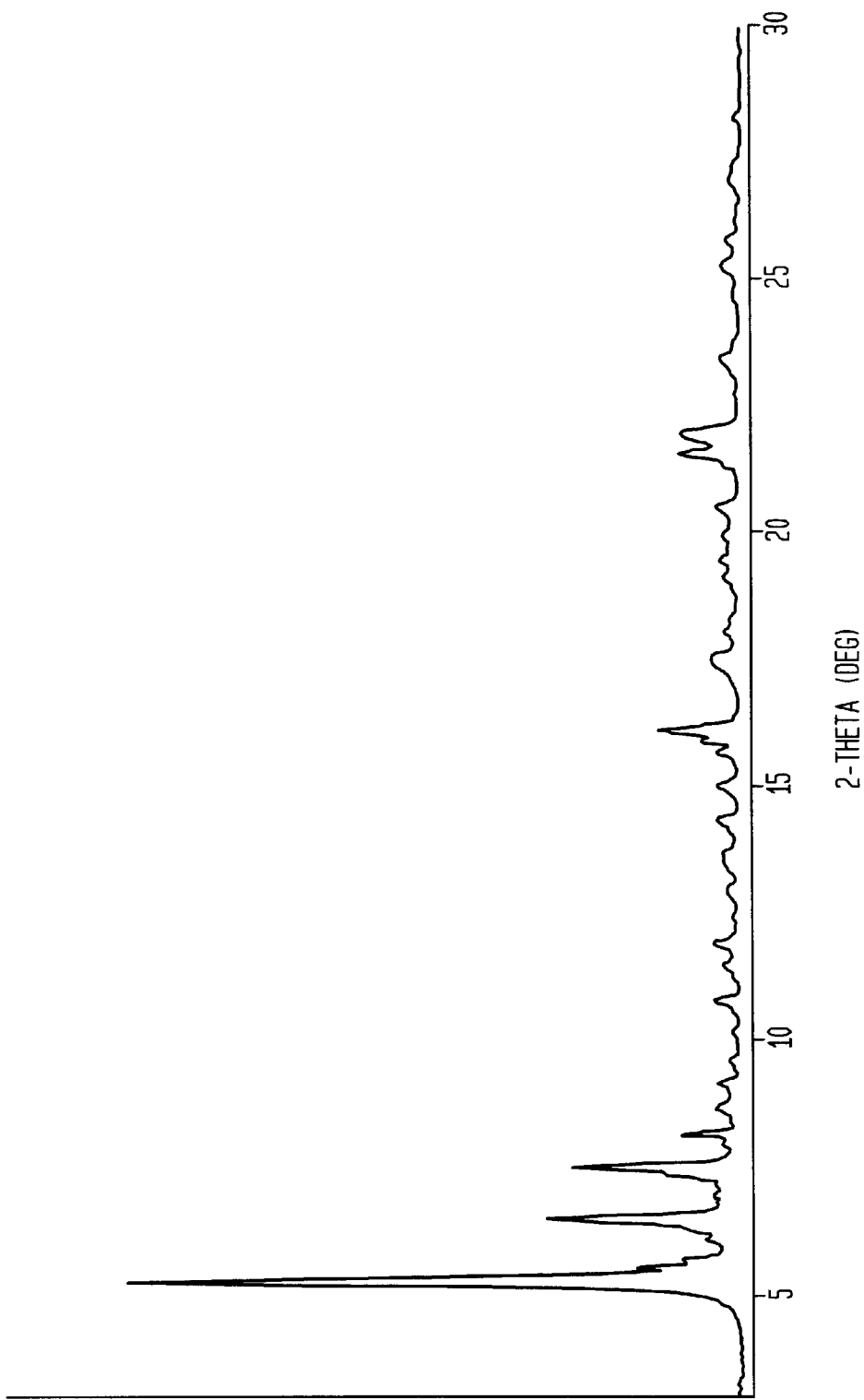
Figure 4:
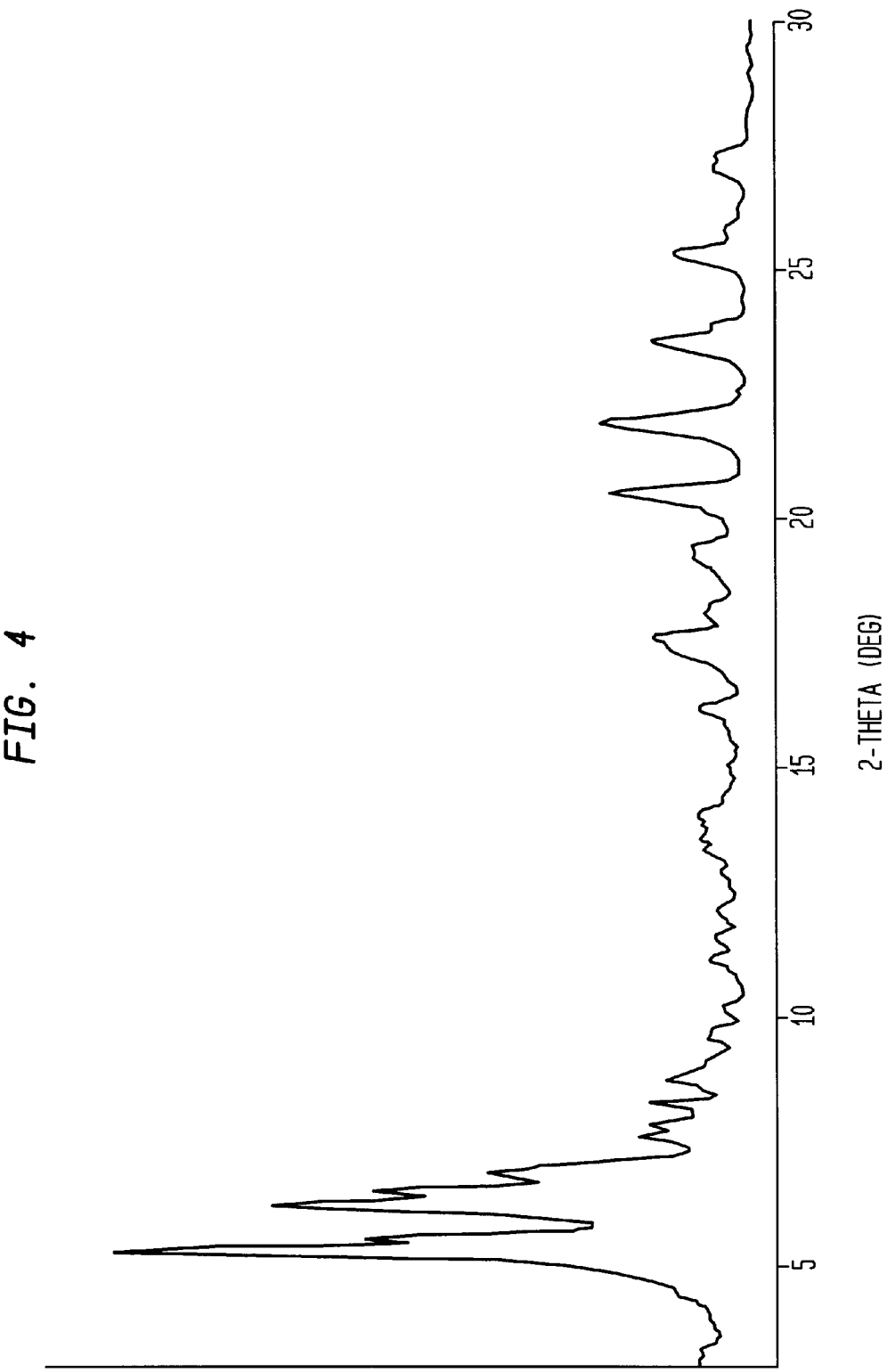

The nickel-quencher (a) and benzophenone (b) powders and the granules obtained by extrusion as described above, are subjected to X-Ray diffraction and the spectra obtained are indicated in the following figures:

FIG. 1: X-Ray diffraction spectrum from powders of the nickel-quencher (a) in powder form;

FIG. 2: X-Ray diffraction spectrum from powders of benzophenone (b) in powder form;

FIG. 3: X-Ray diffraction spectrum from powders of the physical mixture of nickel-quencher (a) and benzophenone (b) powders;

FIG. 4: X-Ray diffraction spectrum from powders of the granules obtained by extrusion, as described above, from the mixture of nickel-quencher (a) and benzophenone (b) powders.

Figure 5:
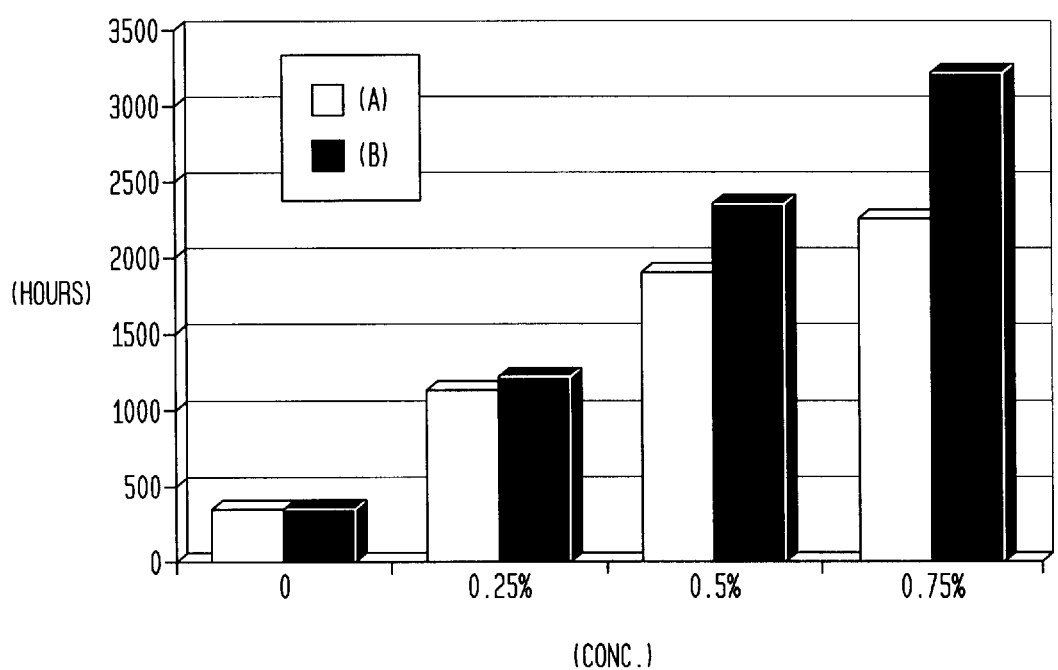

FIG. 5: a histogram illustrating stabilization as a function of concentration.

As can be observed, FIG. 4 shows two diffraction lines at angles 2θ=6.291 and 2θ=6.888 in the X-Ray diffraction spectrum from powders which are not present in the X-Ray diffraction spectrum from powders of the nickel-quencher (a) and benzophenone (b) alone (FIGS. 1 and 2) and their physical mixture (FIG. 3).

As already mentioned above, the crystalline modification of the present invention is useful as a light stabilizer for agricultural films based on polyolefins and polyolefinic copolymers.

Polyolefins and polyolefinic copolymers which can be used for the purpose are:

(1) polymers of mono-olefins and diolefins such as, for example, polypropylene, polyisobutylene, polybut-1-ene, poly-4-methylpent-1-ene, polyisoprene or polybutadiene; as well as polymers of cyclo-olefins such as, for example, cyclopentene or norbornene; polyethylene (which can be optionally cross-linked) such as, for example, high density polyethylene (HDPE), low density polyethylene (LDPE) linear low density polyethylene (LLDPE), branched low density polyethylene (BLDPE).

Polyolefins such as, for example the mono-olefins mentioned in the above paragraph, preferably polyethylene and polypropylene, can be prepared with various methods known in literature, preferably using the following methods:
(a) radicalic polymerization (generally carried out at a high pressure and high temperature);
(b) catalytic polymerization using a catalyst which normally contains one or more metals of groups IVb, Vb, VIb or VIII of the Periodic Table. These metals generally have one or more ligands such as, for example, oxides, halides, alcoholates, esters, ethers, amines, alkyls, alkenyls and/or aryls which can be π- or σ-co-ordinated. These metal complexes can be in free form or supported on substrates such as, for example activated magnesium chloride, titanium(III) chloride, alumina or silicon oxide. These catalysts can be soluble or insoluble in the polymerization medium. The catalysts can be used alone or in the presence of other activators such as, for example, metal alkyls, metal hydrides, halides of metal alkyls, oxides of metal alkyls or metal alkyloxanes, these metals being elements belonging to groups Ia, IIa and/or IIIa of the Periodic Table. The activators can be conveniently modified with other ester, ether, amine or silyl-ether groups. These catalytic systems are usually called Phillips, Standard Oil Indiana, Ziegler (-Natta), TNZ (Du-Pont), metallocene or "single site catalyst" (SSC).

(2) Mixtures of the polymers described under point (1) such as, for example, mixtures of polypropylene with polyisobutylene; mixtures of polypropylene with polyethylene (for example, PP/HDPE, PP/LDPE); mixtures of different types of polyethylene (for example, LDPE/HDPE).

(3) Copolymers of mono-olefins and diolefins with each other or with other vinyl monomers such as, for example, ethylene-propylene copolymers, linear low density polyethylene (LLDPE) and its mixtures with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with polypropylene and a diene such as, for example, hexadiene, dicyclopentadiene or ethylidene-norbornene; and mixtures of these copolymers with each other or with the polymers cited in paragraph (1) such as, for example, polypropylene/ethylene-propylene copolymers, LDPE/ethylene-vinylacetate (EVA) copolymers, LDPE/ethylene-acrylic acid (EAA) copolymers, LLDPE/EVA, LLDPE/EAA, and alternating or random polyalkylene/carbon monoxide copolymers and their mixtures with other polymers such as, for example, polyamides.

Preferred for the purpose are polymers of mono-olefins, preferably α-mono-olefins such as, for example, polypropylene, polyisobutylene, polybut-1-ene, poly-4-methylpent-1-ene, as well as polymers of cyclo-olefins, polyethylene (which can be optionally cross-linked) such as, for example, high density polyethylene (HDPE), low density polyethylene (LDPE), linear low density polyethylene (LLDPE), branched low density polyethylene (BLDPE) and copolymers of these monomers with vinyl acetate. Even more preferred are polyethylene, ethylene/propylene copolymer, ethylene/vinyl acetate copolymer and polypropylene, in particular polyethylene, preferably low density polyethylene (LDPE).

A further object of the present invention relates to agricultural films based on polyolefins or polyolefinic copolymers containing an effective quantity of the crystalline modification described above.

The crystalline modification of the present invention can be used as such or combined with other stabilizers, in the above polymeric agricultural films.

The crystalline modification of the present invention is generally used in a quantity ranging from about 0.1% to about 2% by weight with respect to the weight of the films to be stabilized, preferably between about 0.2% and about 1%.

The crystalline modification of the present invention, optionally in the presence of other additives, can be easily incorporated into the polymers to be stabilized using the conventional techniques.

The resulting polymeric compositions can be transformed into films operating according to the conventional techniques.

The above films based on polyolefins or poly-olefinic copolymers, can contain metal oxides or hydroxides such as, for example, oxides of zinc, aluminum, calcium or magnesium, or hydroxides of zinc, aluminum or calcium, preferably zinc oxide (ZnO), zinc hydroxide [$Zn(OH)_2$], aluminum ortho- or meta-hydroxide [$Al(OH)_3$], aluminum α- or γ-oxide, magnesium oxide (MgO). Zinc oxides or hydroxides are preferred, zinc oxide is even more preferred.

The above metal oxides or hydroxides are generally added in a quantity ranging from 0.005% to 3% by weight with respect to the weight of the films to be stabilized, preferably between 0.005% and 1% by weight, even more preferably between 0.025% and 0.5% by weight.

In many cases, the above films contain a salt of a $C_1$–$C_{30}$ carboxylic acid, preferably a salt of a $C_8$–$C_{22}$ carboxylic acid, even more preferably a salt of a $C_8$–$C_{18}$ carboxylic acid.

Preferred films are those which contain one or more components selected from salts of earth-alkaline metals, zinc salts and aluminum salts of a $C_1$–$C_{30}$ carboxylic acid, hydrotalcites, and sterically hindered amines.

Films based on polyolefins or polyolefinic copolymers containing salts of a $C_1$–$C_{30}$ carboxylic acid are of greatest interest for the purpose. Metal carboxylates which can be optionally added are, mainly, salts of Al, Ba, Ca, Mg, Sr or Zn. Salts of Al, Ca, Mg or Zn, especially of $C_1$–$C_{18}$ carboxylic acids, are preferred. Calcium salts such as, for example, calcium stearate, are even more preferred.

The metal carboxylates are used in a quantity ranging from 0.05% to 2% by weight with respect to the weight of the films to be stabilized, preferably between 0.1% and 1% by weight.

The sterically hindered amines are added in a quantity ranging from about 0.01% to 5% by weight with respect to the weight of the films to be stabilized, preferably between 0.025% and 2% by weight, even more preferably between 0.05% and 1% by weight.

The films described above may advantageously contain a hydrotalcite. Hydrotalcites which can be used for the purpose are selected from those having the following general formula (III):

$$M^{2+}_{1-x} \cdot M^{3+}_x \cdot (OH)_2 \cdot (A^{n-})_{x/n} \cdot pH_2O \qquad (III)$$

wherein:
$M^{2+}$ is Mg, Ca, Sr, Ba, Zn, Pb, Sn and/or Ni;

$M^{3+}$ is Al, B or Bi;

$A^{n-}$ is an anion of the valency n;

n is a number between 1 and 4 extremes included;

x is a number between 0 and 0.5 extremes included;

p is a number between 0 and 2 extremes included;

A is $OH^-$, $Cl^-$, $Br^-$, $I^-$, $ClO_4^-$, $HCO_3^-$, $CH_3COO^-$, $C_6H_5COO^-$, $CO_3^{2-}$, $SO_4^{2-}$, $(COO)_2^{2-}$, $(CHOHCOO)_2^{2-}$, $(CHOH)_4CH_2OHCOO^-$, $C_2H_4(COO)_2^{2-}$, $(CH_2COO)_2^{2-}$, $CH_3CHOHCOO^-$, $SiO_3^{2-}$, $SiO_4^{4-}$, $Fe(CN)_6^{3-}$, $Fe(CN)_6^{4-}$, $BO_3^{3-}$, $PO_3^{3-}$ or $HPO_4^{2-}$.

Preferred hydrotalcites having general formula (III) are those wherein $M^{2+}$ is $Ca^{2+}$, $Mg^{2+}$ or a mixture of $Mg^{2+}$ and $Zn^{2+}$, $A^{n-}$ is $CO_3^{2-}$, $BO_3^{3-}$ or $PO_3^{3-}$, x is a number between 0 and 0.5 extremes included and p is a number between 0 and 2 extremes included.

Other hydrotalcites which can be advantageously used are those having general formula (IIIa)

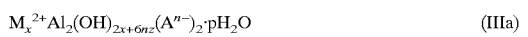  (IIIa)

wherein:

$M^{2+}$ is Mg or Zn, preferably Mg;

$A^{n-}$ is an anion selected from $CO_3^{2-}$, $(COO)_2^{2-}$, $OH^-$ and $S^{2-}$, wherein n is the valency of the anion.

p is a positive number, preferably between 0 and 5 extremes included, for example between 0.5 and 5 extremes included;

x is a positive number preferably between 2 and 6 extremes included;

z is a positive number less than 2.

Preferred hydrotalcites having general formula (IIIa) are those represented by the following formulae (IIIb)–(IIIh):

 (IIIb);

 (IIIc);

 (IIId);

 (IIIe);

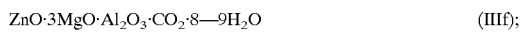 (IIIf);

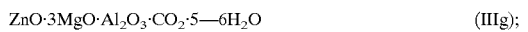 (IIIg);

 (IIIh).

The hydrotalcites can be advantageously used in a quantity ranging from 0.01% to 5% by weight with respect to the weight of the films to be stabilized, preferably between 0.2% and 3% by weight.

Useful sterically hindered amines which can be added to the films described above, can be single compounds or mixtures of these compounds. In the case of mixtures, the quantities indicated above refer to the total quantity of sterically hindered amines used.

Sterically hindered amines refer to compounds containing one or more trivalent groups having general formula (IV):

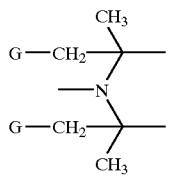

(IV)

wherein G is hydrogen or methyl and not more than one of the free valencies in the above general formula (IV) is saturated with a hydrogen and 2 or 3 of the free valencies represent bonds with carbon atoms or hetero-atoms.

Examples of the above sterically hindered amines are described, for example, in U.S. Pat. Nos. 4,086,204, 4,108,829, 4,263,434, 4,233,412, 4,288,593, 4,315,859, 4,321,374, 4,331,586, 4,413,093, 4,435,555, 4,477,615, 4,335,242, 4,376,836, 4,433,145, 4,459,395, 4,477,615, 4,533,688, 4,540,728, 4,547,548 and 4,740,544; in European patent applications EP 22,080, EP 29,522, EP 24,338, EP 42,554, EP 44,499, EP 70,386, EP 72,009, EP 75,849, EP 82,244, EP 94,048, EP 107,615, EP 402,889 and EP 357,223; and in German patent application DE 3,530,666; the texts of the above documents should be considered as forming an integrant part of the present description.

In many cases, the sterically hindered amines are cyclic, in particular they are compounds selected from polyalkylpiperidine derivatives containing at least one group having general formula (V):

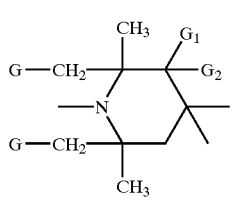

(V)

wherein G is hydrogen or methyl, and $G_1$ and $G_2$ are hydrogen, methyl or, together, they are a substituent =O; the polyalkylpiperidine groups having general formula (V) are preferably substituted in position 4 by one or two polar substituents or by a polar ring having a spiro structure.

Of particular importance are cyclic sterically hindered amines containing at least one group having general formula (V) wherein G is hydrogen and $G_1$ and $G_2$ are hydrogen or, together, are a substituent =O.

In particular, derivatives of 2,2,6,6-tetramethylpiperidine are advantageously used.

Of particular importance is the use of compounds belonging to the group of polyalkylpiperidine carrying at least one group having general formula (V) in the molecule, selected from those listed below under points (a)–(i)

(a) Compounds Having General Formula (V):

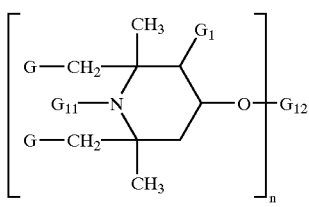

(VI)

wherein n is a number between 1 and 4 extremes included; G and Gi are, each independently, hydrogen or methyl; $G_{11}$ is hydrogen, a $C_1$–$C_{16}$ alkyl group, a $C_3$–$C_8$ alkenyl group, a $C_3$–$C_8$ alkinyl group, a $C_7$–$C_{12}$ aralalkyl group, a $C_1$–$C_8$ alkanoyl group, a $C_3$–$C_5$ alkenoyl group, a glycidyl group, a —$CH_2CH(OH)$—Z group wherein Z is hydrogen, methyl, or phenyl, $G_{11}$ preferably being hydrogen, a $C_1$–$C_4$ alkyl group, an allyl, a benzyl, an acetyl or an acryloyl; $G_{12}$, when n is 1, is hydrogen, a $C_1$–$C_{18}$ alkyl group which can be interrupted by one or more oxygen atoms, a cyanoethyl group, a benzyl, a glycidyl group, a monovalent radical of a carboxylic acid, of a carbamic acid or of an acid containing phosphorous, aliphatic, cycloaliphatic or aralaphatic, unsaturated or aromatic, or a monovalent silyl radical, preferably a radical of an aliphatic carboxylic acid having from 2 to 18 carbon atoms, of a cycloaliphatic carboxylic acid having from 7 to 15 carbon atoms, of an α,β-unsaturated carboxylic acid having from 3 to 5 carbon atoms, of an aromatic carboxylic acid having from 7 to 15 carbon atoms, said carboxylic acids optionally substituted in the aliphatic, cycloaliphatic or aromatic part with 1–3 —$COOZ_{12}$ groups wherein $Z_{12}$ is hydrogen, a $C_1$–$C_{20}$ alkyl group, a $C_3$–$C_{12}$ alkenyl group, a $C_5$–$C_7$ cycloalkyl group, a phenyl or a benzyl; $G_{12}$, when n is 2, is a $C_2$–$C_{12}$ alkylene group, a $C_4$–$C_2$ alkenylene group, a xylylene group, a divalent radical of a dicarboxylic acid, of a dicarbamic acid or of an acid containing phosphorous, aliphatic, cycloaliphatic, araliphatic or aromatic, or a divalent silyl radical, preferably a radical of an aliphatic dicarboxylic acid having from 2 to 36 carbon atoms, of a cycloaliphatic or aromatic dicarboxylic acid having from 8 to 14 carbon atoms, of an aliphatic, cycloaliphatic or aromatic dicarbamic acid having from 8 to 14 carbon atoms, said dicarboxylic acids optionally substituted in the aliphatic, cycloaliphatic or aromatic part, with 1 or 2 —$COOZ_{12}$ groups wherein $Z_{12}$ has the same meanings described above; $G_{12}$, when n is 3, is a trivalent radical of an aliphatic, cycloaliphatic or aromatic tricarboxylic acid, optionally substituted in the aliphatic, cycloaliphatic or aromatic part, with a —$COOZ_{12}$ group wherein $Z_{12}$ has he same meanings described above, or of an aromatic tricarbamic acid or of an acid containing phosphorous, or it is a trivalent silyl radical; $G_{12}$, when n is 4, is a tetravalent radical of an aliphatic, cycloaliphatic or aromatic tetracarboxylic acid.

Radicals of tetracarboxylic acids comprise, in any case, radicals having the formula (—$CO)_nR$ wherein n has the same meaning defined above and R can be easily deduced from the definition described above.

Examples of $C_1$–$C_{12}$ alkyl groups are: methyl, ethyl, n-propyl, n-butyl, sec-butyl, t-butyl, n-hexyl, n-octyl, 2-ethylhexyl, n-nonyl, n-decyl, n-undecyl, n-dodecyl, etc.

Examples of $G_{11}$ and $G_{12}$ substituents, when they are a $C_1$–$C_{18}$ alkyl group, are, in addition to the groups described above: n-tridecyl, n-tetradecyl, n-hexadecyl, n-octadecyl, etc.

Examples of the substituent $G_{11}$, when it is a $C_3$–$C_8$ alkenyl group, are: 1-propenyl, allyl, methallyl, 2-butenyl, 2-pentenyl, 2-hexenyl, 2-octenyl, 4-t-butyl-2-butenyl, etc.

When the substituent $G_{11}$ is a $C_3$–$C_8$ alkinyl group, it is preferably propargyl.

When the substituent $G_{11}$ is a $C_7$–$C_{12}$ aralalkyl group, it is in particular phenethyl, preferably benzyl.

Examples of the substituent $G_{11}$, when it is a $C_1$–$C_8$ alkanoyl group, are: formyl, propionyl, butyryl, octanoyl, preferably acetyl and, when it is a $C_3$–$C_5$ alkenoyl group, preferably acryloyl.

Examples of the substituent $G_{12}$, when it is a monovalent radical of a carboxylic acid, are radicals of the following acids: acetic, caproic, stearic, acrylic, methacrylic, benzoic, β-(3,5-di-tert-butyl-4-hydroxyphenyl)propionic, etc.

Examples of the substituent $G_{12}$, when it is a monovalent silyl radical, are: a radical having the general formula —$(C_jH_{2j})$—$Si(Z')_2Z''$ wherein j is an integer between 2 and 5 extremes included, and Z' and Z'' are, each independently, a $C_1$–$C_4$ alkyl group or a $C_1$–$C_4$ alkoxyl group.

Examples of the substituent $G_{12}$, when it is a divalent radical of a dicarboxylic acid, are radicals of the following acids: malonic, succinic, glutaric, adipic, suberic, sebacic, maleic, itaconic, phthalic, dibutylmalonic, dibenzylmalonic, butyl(3,5-di-t-butyl-4-hydroxybenzyl)malonic, bicycloheptenedicarboxylic, etc.

Examples of the substituent $G_{12}$, when it is a trivalent radical of a tricarboxylic acid, are radicals of the following acids: trimellitic, citric, nitrilotriacetic, etc.

Examples of the substituent $G_{12}$ when it is a tetravalent radical of a tetracarboxylic acid, are radicals of the following acids: butane-1,2,3,4-tetracarboxylic, pyromellitic, etc.

Examples of the substituent $G_{12}$, when it is a divalent radical of a dicarbamic acid, are radicals of the following acids: hexamethylenedicarbamic, 2,4-to-luylenedicarbamic, etc.

Compounds having general formula (VI) are preferred, wherein G is hydrogen, $G_{11}$ is hydrogen or methyl, n is 2 and $G_{12}$ is a diacyl radical of an aliphatic dicarboxylic acid having from 4 to 12 carbon atoms.

Specific examples of polyalkylpiperidines having general formula (VI) are:

1) 4-hydroxy-2,2,6,6-tetramethylpiperidine;
2) 1-allyl-4-hydroxy-2,2,6,6-tetramethylpiperidine;
3) 1-benzyl-4-hydroxy-2,2,6,6-tetramethylpiperidine;
4) 1-(4-t-butyl-2-butenyl)-4-hydroxy-2,2,6,6-tetramethylpiperidine;
5) 4-stearyloxy-2,2,6,6-tetramethylpiperidine;
6) 1-ethyl-4-salicyloyloxy-2,2,6,6-tetramethylpiperidine;
7) 4-methacryloyloxy-1,2,2,6,6,-pentamethylpiperidine;
8) 1,2,2,6,6-pentamethylpiperidin-4-yl-β-(3,5-di-t-butyl-4-hydroxyphenyl)propionate;
9) di(1-benzyl-2,2,6,6-tetramethylpiperidin-4-yl)maleate;
10) di(2,2,6,6-tetramethylpiperidin-4-yl)succinate;
11) di(2,2,6,6-tetramethylpiperidin-4-yl)glutarate;
12) di(2,2,6,6-tetramethylpiperidin-4-yl)adipate;
13) di(2,2,6,6-tetramethylpiperidin-4-yl)sebacate;
14) di(1,2,2,6,6-pentamethylpiperidin-4-yl)sebacate;
15) di(1,2,3,6-tetramethyl-2,6-diethylpiperidin-4-yl)sebacate;
16) di(1-allyl-2,2,6,6-tetramethylpiperidin-4-yl)phthalate;
17) (1-acetyl-2,2,6,6-tetramethylpiperidin-4-yl)acetate;
18) ester of tri(2,2,6,6-tetramethylpiperidin-4-yl)trimellitic acid;

19) 1-acryloyl-4-benzyloxy-2,2,6,6-tetramethylpiperidilne;
20) di(2,2,6,6-tetramethylpiperidin-4-yl)diethylmalonate;
21) di(1,2,2,6,6-pentamethylpiperidin-4-yl)dibutylmalonate;
22) di(1,2,2,6,6-pentamethylpiperidin-4-yl)butyl-(3,5-di-tert-butyl-4-hydroxybenzyl)malonate;
23) hexane-1',6'-bis(4-carbamoyloxy-1-n-butyl-2,2,6,6-tetramethylpiperidine);
24) toluene-2',4'-bis(4-carbamoyloxy-1-n-propyl-2,2,-6,6-tetramethylpiperidine;
25) dimethyl-bis(2,2,6,6-tetramethylpiperidin-4-oxy)silane;
26) phenyl-tris(2,2,6,6-tetramethylpiperidin-4-oxy)silane;
27) tris(1-propyl-2,2,6,6-tetramethylpiperidin-4-yl)phosphite;
28) tris(1-propyl-2,2,6,6-tetramethylpiperidin-4-yl)phosphate;
29) bis(1,2,2,6,6,-pentamethylpiperidin-4-yl)phenylphosponate;
30) 4-hydroxy-1,2,2,6,6,-pentamethylpiperidine;
31) 4-hydroxy-N-hydroxyethyl-2,2,6,6,-tetramethylpiperidine;
32) 4-hydroxy-N-(2-hydroxypropyl)-2,2,6,6-tetramethylpiperidine;
33) 1-glycidyl-4-hydroxy-2,2,6,6-tetramethylpiperidine.

(b) Compounds Having General Formula (VII):

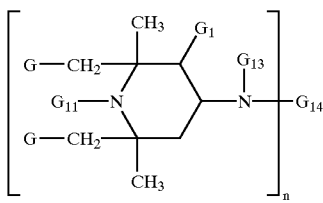

(VII)

wherein n is 1 or 2; G, $G_1$ and $G_{11}$ have the same meanings defined under point (a); $G_{13}$ is hydrogen, a $C_1$–$C_{12}$ alkyl group, a $C_2$–$C_5$ hydroxyalkyl group, a $C_5$–$C_7$ cycloalkyl group, a $C_7$–$C_8$ aralalkyl group, a $C_2$–$C_8$ alkanoyl group, a $C_3$–$C_5$ alkenoyl group, a benzoyl group, or a group having the following general formula:

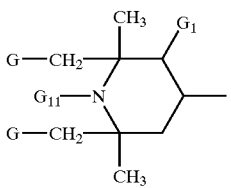

wherein G, $G_1$ and $G_{11}$ have the same meanings defined under point (a); $G_{14}$, when n is 1, is hydrogen, a $C_1$–$C_{18}$ alkyl group, a $C_3$–$C_8$ alkenyl group, a $C_5$–$C_7$ cycloalkyl group, a $C_1$–$C_4$ alkyl group substituted with a hydroxyl group, with a cyano group, with an alkoxycarbonyl group or with a carbamide group, a glycidyl group, a group having the formula —$CH_2$—$CH(OH)$—Z or having the formula —CONH—Z wherein Z is hydrogen, methyl or phenyl; $G_{14}$, when n is 2, is a $C_2$–$C_{12}$ alkylene group, a $C_6$–$C_{12}$ arylene group, a xylylene group, a group having the formula —$CH_2$—$CH(OH)$—$CH_2$— or having the formula —$CH_2$—$CH(OH)$—$CH_2$—O—D—O— wherein D is a $C_2$–$C_{10}$ alkylene group, a $C_6$–$C_{15}$ arylene group, a $C_6$–$C_{12}$ cycloalkylene group; or, on the condition that $G_{13}$ is not an alkanoyl group, an alkenoyl group or a benzoyl group, $G_{14}$ can also be a 1-oxo-($C_2$–$C_{12}$)-alkylene group, a divalent radical of a dicarboxylic acid or of a dicarbamic acid, aliphatic, cycloaliphatic or aromatic, or also a —CO— group; or, when n is 1, $G_{13}$ and $G_{14}$ together can also be a divalent radical of a 1,2- or 1,3-dicarboxylic acid, aliphatic, cycloaliphatic or aromatic.

The term aryl refers to an aromatic hydrocarbon such as, for example, phenyl or naphthyl. The term aralkyl refers to an alkyl substituted with an aromatic hydrocarbon, for example, a hydrocarbon having from 6 to 10 carbon atoms; examples of aralkyls are benzyl, α-methylbenzyl, etc.

$C_1$–$C_{12}$ alkyl or $C_1$–$C_{18}$ alkyl groups have already been defined under point (a).

$C_5$–$C_7$ cycloalkyl groups are, preferably, cyclohexyl.

When $G_{13}$ is a $C_7$–$C_8$ aralkyl group, it is phenylethyl, preferably benzyl.

When $G_{13}$ is a $C_2$–$C_5$ hydroxyalkyl group, it is 2-hydroxyethyl, 2-hydroxypropyl, etc.

Examples of $G_{13}$, when it is a $C_2$–$C_{18}$ alkanoyl group, are: propionyl, butyryl, octanoyl, dodecanoyl, hexadecanoyl, octadecanoyl, etc., preferably acetyl and, when it is a $C_3$–$C_5$ alkenoyl group, preferably acryloyl.

Examples of $G_{14}$, when it is a $C_2$–$C_8$ alkenyl group, are: allyl, methallyl, 2-butenyl, 2-pentenyl, 2-hexenyl, 2-octenyl, etc.

Examples of $G_{14}$, when it is a $C_1$–$C_4$ alkyl group substituted by a hydroxyl, cyano, alkoxycarbonyl or carbamide group, are: 2-hydroxyethyl, 2-hydroxypropyl, 2-cyanoethyl, methoxycarbonylmethyl, 2-ethoxycarbonylethyl, 2-aminocarbonylpropyl, 2-(dimethylaminocarbonyl)ethyl, etc.

Examples of $C_2$–$C_{12}$ alkylene groups are: ethylene, propylene, 2,2-dimethylpropylene, tetramethylene, hexamethylene, octamethylene, decamethylene, dodecamethylene, etc.

Examples of $C_6$–$C_{15}$ arylene groups are: o- m- or p-phenylene, 1,4-naphthylene, 4,4'-diphenylene, etc.

Examples of $C_6$–$C_{12}$ cycloalkylene groups are, preferably, cyclohexylene.

Preferred compounds having general formula (VII) are those wherein n is 1 or 2, G is hydrogen, $G_{11}$ is hydrogen or methyl, $G_{13}$ is hydrogen, a $C_1$–$C_{12}$ alkyl group or a group having the formula:

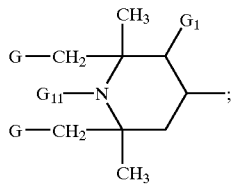

and $G_{14}$, when n is 1, is hydrogen or a $C_1$–$C_{12}$ alkyl group and, when n is 2, is a $C_2$–$C_8$ alkylene group or a 1-oxo-$_2$–$C_8$ alkylene group.

Specific examples of polyalkylpiperidines having general formula (VII) are:

1) N,N'-bis(2,2,6,6-tetramethylpiperidin-4-yl)hexamethylene-1,6-diamine;

2) N,N'-bis(2,2,6,6-tetramethylpiperidin-4-yl) hexamethylene-1,6-diacetamide;
3) bis(2,2,6,6-tetramethylpiperidin-4-yl)amine;
4) 4-benzoylamino-2,2,6,6-tetramethylpiperidine;
5) N,N'-bis(2,2,6,6-tetramethylpiperidin-4-yl)-N,N'-dibutyladipamide;
6) N,N'-bis(2,2,6,6-tetramethylpiperidin-4-yl)-N,N'-dicyclohexyl-2-hydroxypropylene-1,3-diamine;
7) N,N'-bis(2,2,6,6-tetramethylpiperidin-4-yl)-p-xylylenediamine;
8) N,N'-bis(2,2,6,6-tetramethylpiperidin-4-yl)-succinediamide;
9) bis(2,2,6,6-tetramethylpiperidin-4-yl)-N-(2,2,6,6-tetramethylpiperidin-4-yl)-β-aminodipropionate;
10) compound having the formula:

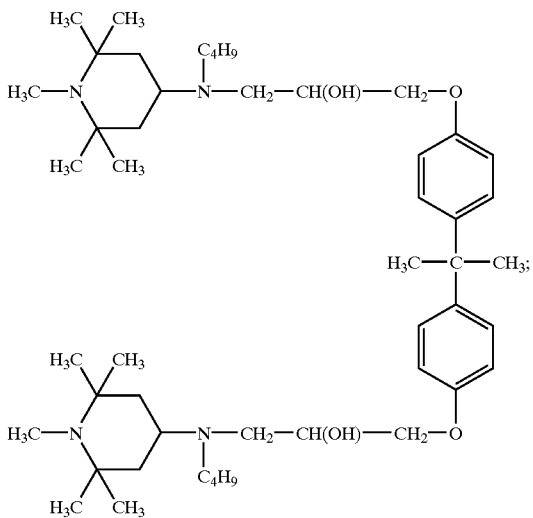

11) 4-[bis(2-hydroxyethyl)amino]-1,2,2,6,6-pentamethylpiperidine;
12) 4-(3-methyl-4-hydroxy-5-tert-butylbenzamido)-2,2,6,6-tetramethylpiperidine;
13) 4-methacrylamido-1,2,2,6,6-pentamethylpiperidine.

(c) Compounds Having General Formula (VIII):

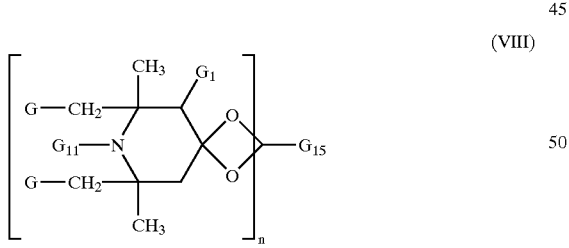

(VIII)

wherein n is 1 or 2; G, $G_1$ and $G_{11}$ have the same meanings desribed under point (a); $G_{15}$, when n is 1, is a $C_2$–$C_8$ alkylene or hydroxyalkylene group, or a $C_4$–$C_{22}$ acyloxyalkylene group, and, when n is 2, is a $(-CH_2)_2C(CH_2-)_2$ group.

Examples of $G_{15}$, when it is a $C_2$–$C_8$ alkylene or hydroxyalkylene group, are: ethylene, 1-methylethylene, propylene, 2-ethylpropylene, 2-ethyl-2-hydroxymethyl-propylene, etc.

An example of $G_{15}$, when it is a $C_4$–$C_{22}$ acyloxyalkylene group is 2-ethyl-2-acetoxymethylpropylene.

Specific examples of polyalkylpiperidines having general formula (VIII) are:

1) 9-aza-8,8,10,10-tetramethyl-1,5-dioxaspiro[5.5] undecane;
2) 9-aza-8,8,10,10-tetramethyl-3-ethyl-1,5-dioxa-spiro [5.5]undecane;
3) 8-aza-2,7,7,8,9,9-hexamethyl-1,4-dioxaspiro[4.5]-decane;
4) 9-aza-3-hydroxymethyl-3-ethyl-8,8,9,10,10-pentamethyl-1,5-dioxaspiro[5.5]undecane;
5) 9-aza-3-ethyl-3-acetoxymethyl-9-acetyl-8,8,10,10-tetramethyl-1,5-dioxaspiro[5.5]undecane;
6) 2,2,6,6-tetramethylpiperidine-4-spiro-2'-(1',3'-dioxane)-5'-spiro-5"-(1",3"-dioxane)-2"-spiro-4'''-(2''',2''',6''',6'''-tetramethylpiperidine);

(d) Compounds having general formula (IXA), (IXB) and (IXC), the compounds having general formula (IXC) being preferred:

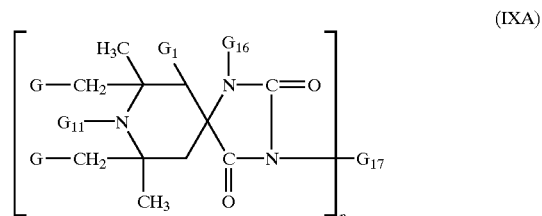

(IXA)

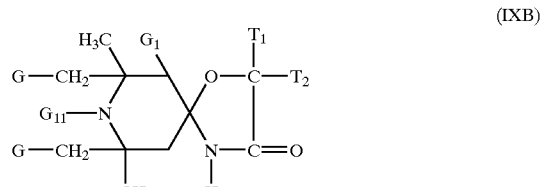

(IXB)

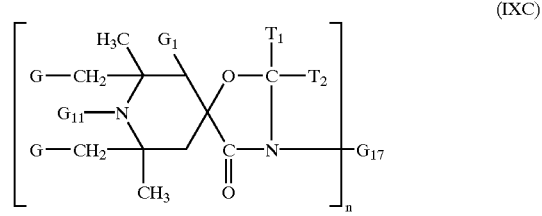

(IXC)

wherein n is 1 or 2, G, $G_1$ and $G_{11}$ have the same meanings described under point (a); $G_{16}$ is hydrogen, a $C_1$–$C_{12}$ alkyl group, an allyl group, a benzyl, a glycidyl group or a $C_2$–$C_6$ alkoxyalkyl group; $G_{17}$, when n is 1, is hydrogen, a $C_1$–$C_{12}$ alkyl group, a $C_3$–$C_5$ alkenyl group, a $C_7$–$C_9$ aralalkyl group, a $C_5$–$C_7$ cycloalkyl group, a $C_2$–$C_4$ hydroxyalkyl group, a $C_2$–$C_6$ alkoxyalkyl group, a $C_6$–$C_{10}$ aryl group, a glycidyl group, or a group having the formula $-(CH_2)_p-COO-Q$ or $-(CH_2)_p-O-CO-Q$ wherein p is 1 or 2 and Q is a $C_1$–$C_4$ alkyl group or a phenyl; $G_{17}$, when n is 2, is a $C_2$–$C_{12}$ alkylene group, a $C_4$–$C_{12}$ alkenylene group, a $C_6$–$C_{12}$ arylene group, a group having the formula $-CH_2-CH(OH)-CH_2-O-D-O-CH_2-CH(OH)-CH_2-$ wherein D is a $C_2$–$C_{10}$ alkylene group, a $C_6$–$C_{15}$ arylene group, a $C_6$–$C_{12}$ cycloalkylene group, or a group having the formula $-CH_2CH(OZ')CH_2-(OCH_2-CH(OZ')CH_2)_2$ wherein Z' is hydrogen, a $C_1$–$C_{18}$ alkyl group, an allyl, a benzyl, a $C_2$–$C_{12}$ alkanoyl group or a benzoyl; $T_1$ and $T_2$ are, each independently, hydrogen, a $C_1$–$C_{18}$ alkyl group, a $C_6$–$C_{10}$ aryl group, a $C_7$–$C_9$ aralalkyl group, said groups optionally substituted with a halogen atom or with a $C_1$–$C_4$ alkyl group; or $T_1$ and $T_2$, considered jointly with the carbon atom to which they are bound, form a $C_5$–$C_{14}$ cycloalkane ring.

Examples of $C_1$–$C_{12}$ alkyl groups are: methyl, ethyl, n-propyl, n-butyl, sec-butyl, t-butyl, n-hexyl, n-octyl, 2-ethylhexyl, n-nonyl, n-decyl, n-undecyl, n-dodecyl, etc.

Examples of $C_1$–$C_{18}$ alkyl groups are, in addition to those listed above: n-tridecyl, n-tetradecyl, n-hexadecyl, n-octadecyl, etc.

Examples of $C_2$–$C_6$ alkoxyalkyl groups are: methoxymethyl, ethoxymethyl, propoxymethyl, t-butoxymethyl, ethoxyethyl, ethoxypropyl, n-butoxyethyl, t-butoxyethyl, isopropoxyethyl, propoxypropyl, etc.

Examples of $G_{17}$, when it is a $C_3$–$C_5$ alkenyl group are: 1-propenyl, allyl, methallyl, 2-butenyl, 2-pentenyl, etc.

Examples of $G_{17}$, $T_1$ and $T_2$, when they are a $C_7$–$C_9$ aralkyl group are: phenethyl, preferably benzyl.

Examples of cycloalkane rings, formed by $T_1$ and $T2$ when these substituents are considered jointly with the carbon atom to which they are bound, are: cyclopentane, cyclohexane, cyclo-octane, cyclododecane, etc.

Examples of $G_{17}$, when it is a $C_2$–$C_4$ hydroxyalkyl group, are: 2-hydroxyethyl, 2-hydroxypropyl, 2-hydroxybutyl, 4-hydroxybutyl, etc.

Examples of $G_{17}$, $T_1$ and $T_2$, when they are a $C_6$–$C_{10}$ aryl group are: α- or β-naphtyl, optionally substituted with a halogen atom or a $C_1$–$C_4$ alkyl group, etc.

Examples of $G_{17}$, when it is a $C_2$–$C_{12}$ alkylene group are, ethylene, propylene, 2,2-dimethylpropylene, tetramethylene, hexamethylene, octamethylene, decamethylene, dodecamethylene, etc.

Examples of $G_{17}$, when it is a $C_4$–$C_{12}$ alkenylene group are: 2-butenylene, 2-pentenylene, 3-hexenylene, etc.

Examples of $G_{17}$, when it is a $C_6$–$C_{12}$ arylene group are: o-, m- or p-phenylene, 1,4-naphthylene, 4,4'-di-phenylene, etc.

Examples of Z', when it is a $C_2$–$C_{12}$ alkanoyl group are: propionyl, butyryl, octanoyl, dodecanoyl, preferably acetyl.

Examples of D, when it is a $C_2$–$C_{10}$ alkylene group, a $C_6$–$C_{15}$ arylene group or a $C_6$–$C_{12}$ cycloalkylene group are defined above under point (b).

Specific examples of polyalkylpiperidines having general formula (IX) are:

1) 3-benzyl-1,3,8-triaza-7,7,9,9-tetramethylspiro-[4.5]decane-2,4-dione;
2) 3-n-octyl-1,3,8-triaza-7,7,9,9-tetramethylspiro-[4.5]decane-2,4-dione;
3) 3-allyl-1,3,8-triaza-1,7,7,9,9-pentamethylspiro-[4.5]decane-2,4-dione;
4) 3-glycidyl-1,3,8-triaza-7,7,8,9,9-pentamethyl-spiro[4.5]decane-2,4-dione;
5) 1,3,7,7,8,9,9-heptamethyl-1,3,8-triazaspiro[4.5]-decane-2,4-dione;
6) 2-isopropyl-7,7,9,9-tetramethyl-1-oxa-3,8-diaza-4-oxospiro[4.5]decane;
7) 2,2-dibutyl-7,7,9,9-tetramethyl-1-oxa-3,8-diaza-4-oxospiro[4.5]decane;
8) 2,2,4,4-tetramethyl-7-oxa-3,20-diaza-21-oxodi-spiro[5.1.11.2]heneicosane;
9) 2-butyl-7,7,9,9-tetramethyl-1-oxa-4,8-diaza-3-oxospiro[4.5]decane; and, preferably,
10) 8-acetyl-3-dodecyl-1,3,8-triaza-7,7,9,9-tetra-methylspiro[4.5]decane-2,4-dione;

or a compound having one of the following formulae:

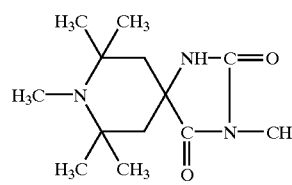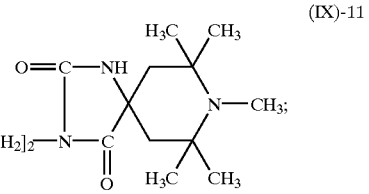

(IX)-11

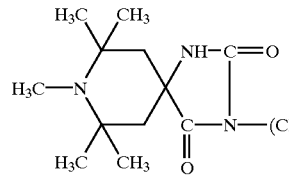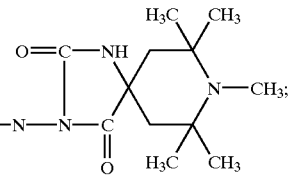

(IX)-12

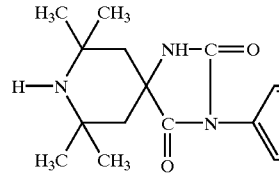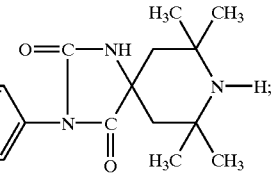

(IX)-13

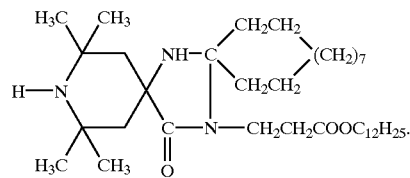

(IX)-14

(e) Compounds Having General Formula (X):

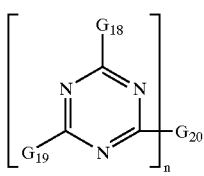

wherein n is 1 or 2, and $G_{18}$ is a group having one of the following formulae:

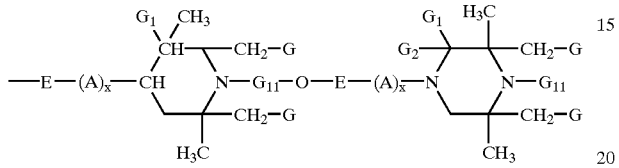

wherein G and $G_{11}$ have the same meanings described under point (a); $G_1$ and $G_2$ are hydrogen, methyl, or together form a substituent =O, E is —O— or —N$G_{13}$—; A is a $C_2$–$C_6$ alkylene group or a —(CH$_2$)$_3$—O— group; x is 0 or 1; $G_{13}$ is hydrogen, a $C_1$–$C_{12}$ alkyl group, a $C_2$–$C_5$ hydroxyalkyl group, a $C_5$–$C_7$ cycloalkyl group; $G_{19}$ has the same meanings as $G_{18}$ or is one of the following groups: —N$G_{21}G_{22}$, —O$G_{23}$, —NHCH$_2$O$G_{23}$ or —N(CH$_2$O$G_{23}$)$_2$; $G_{20}$, when n is 1, has the same meanings as $G_{18}$ or $G_{19}$ and, if n is 2, it is an —E—B—E— group wherein B is a $C_2$–$C_8$ alkylene group optionally interrupted by 1 or 2 —N($G_{21}$)— groups; $G_{21}$ is a $C_1$–$C_{12}$ alkyl group, a cyclohexyl group, a benzyl, a $C_1$–$C_4$ hydroxyalkyl group, or a group having the following general formula:

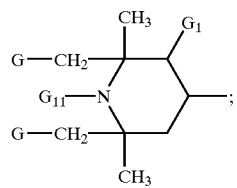

$G_{22}$ is a $C_1$–$C_{12}$ alkyl group, a cyclohexyl group, a benzyl, a $C_1$–$C_4$ hydroxyalkyl group; $G_{23}$ is hydrogen, a $C_1$–$C_{12}$ alkyl group, a phenyl, or $G_{21}$ and $G_{22}$ together are a $C_4$–$C_5$ alkylene or oxyalkylene group, for example:

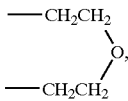

or a group having the formula:

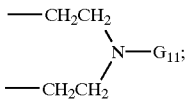

$G_{21}$ is a group having the general formula:

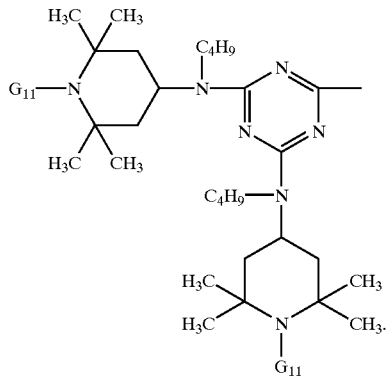

Examples of $C_1$–$C_{12}$ alkyl groups are: methyl, ethyl, n-propyl, n-butyl, sec-butyl, t-butyl, n-hexyl, n-octyl, 2-ethylhexyl, n-nonyl, n-decyl, n-undecyl, n-dodecyl, etc.

Examples of $C_1$–$C_4$ hydroxyalkyl groups are: 2-hydroxyethyl, 2-hydroxypropyl, 3-hydroxypropyl, 2-hydroxybutyl, 4-hydroxybutyl, etc.

Examples of A, when it is a $C_2$–$C_6$ alkylene group are: ethylene, propylene, 2,2-dimethylpropylene, tetramethylene, hexamethylene, etc.

Examples of $G_{21}$ and $G_{22}$, when they jointly form a $C_4$–$C_5$ alkylene or oxyalkylene group, are: tetramethylene, pentamehylene, 3-oxapentamethylene, etc.

Specific examples of polyalkylpiperidines having general formula (X) are:

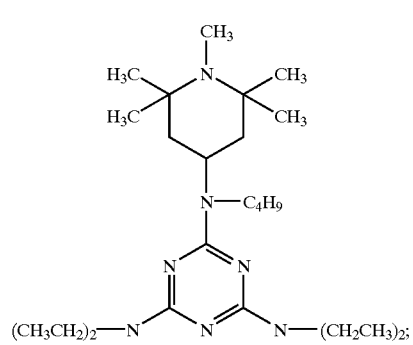

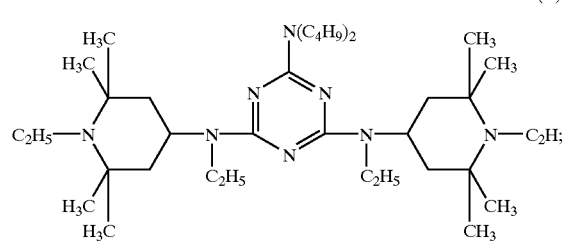

-continued
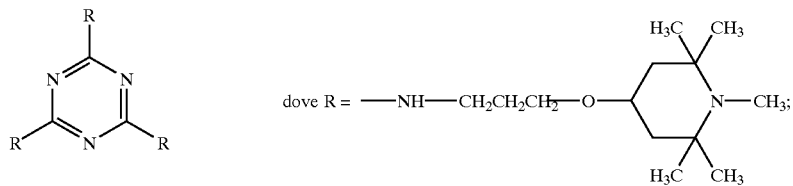
(X)-3
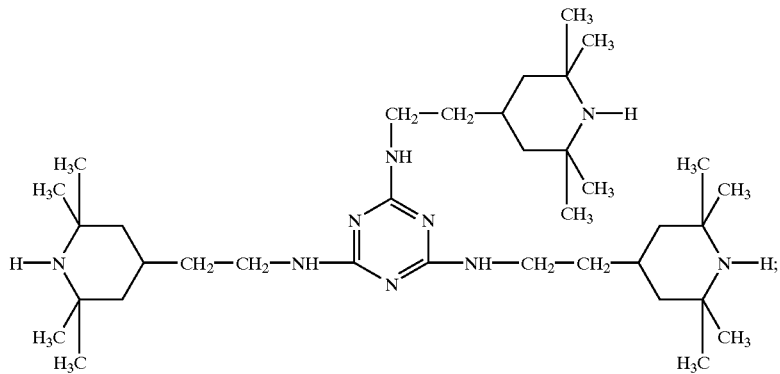
(X)-4
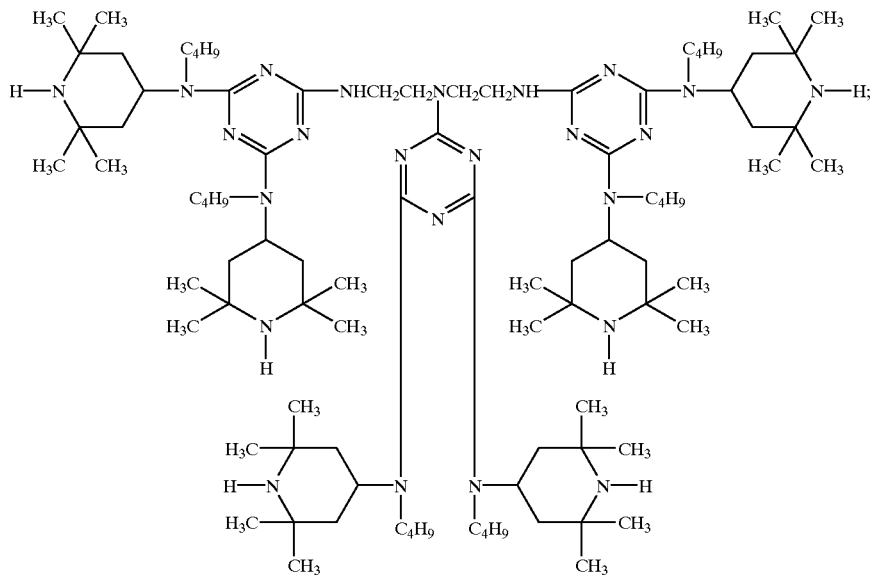
(X)-5
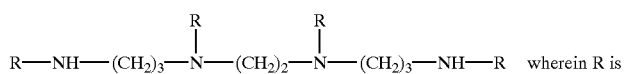
wherein R is
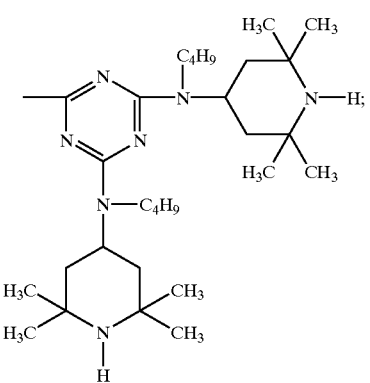
(X)-6

-continued
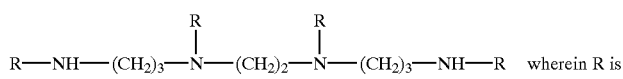 wherein R is
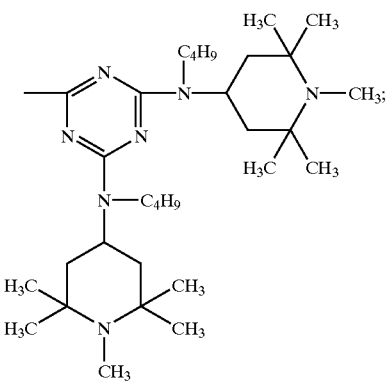
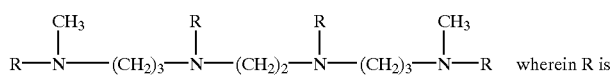 wherein R is
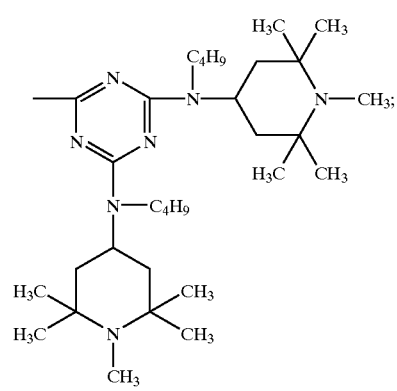
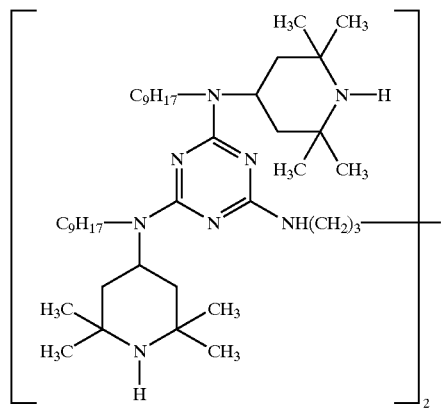
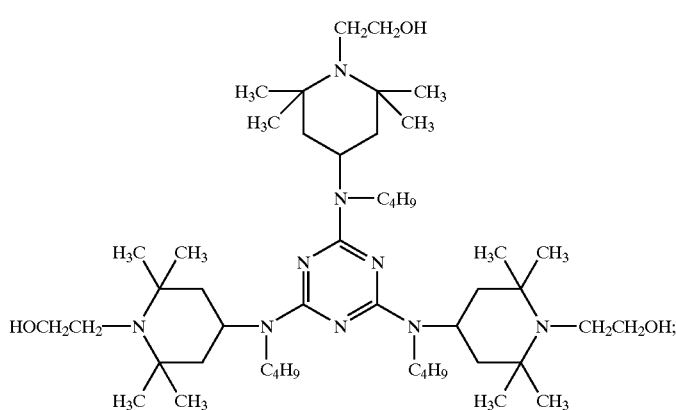

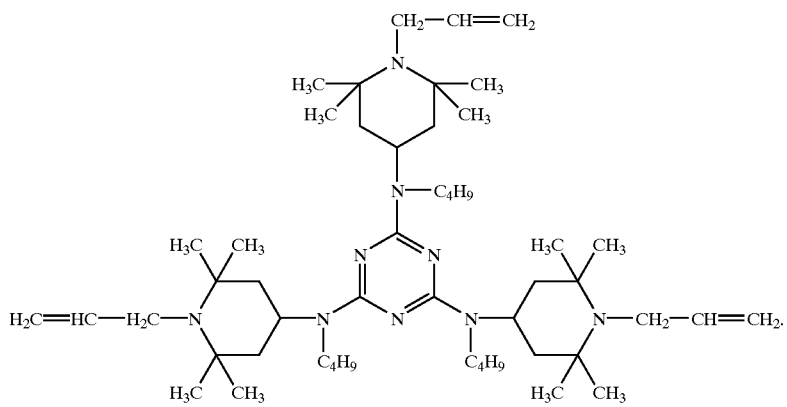
(X)-11

(f) Oligomeric or polymeric compounds whose recurrent structural unit contains a 2,2,6,6tetramethyl-piperidine radical having general formula (V), in particular polyesters, polyethers, polyamides, polyamines, polyurethanes, polyureas, polyamino-triazines, poly (meth)acrylates, poly(meth)acrylamides, and their copolymers containing said radical.

Specific examples of the above 2,2,6,6-polyalkyl-piperidines are represented by the following formulae wherein m is a number between 2 and 200:

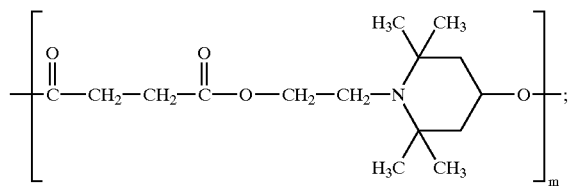
(XI)-1

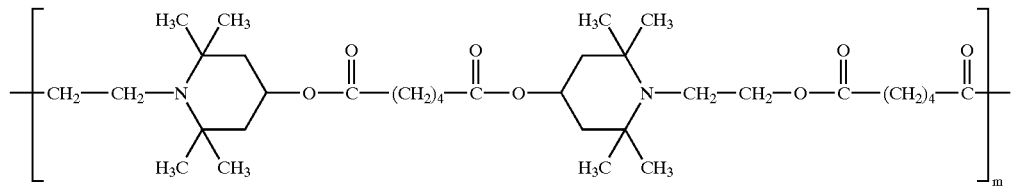
(XI)-2

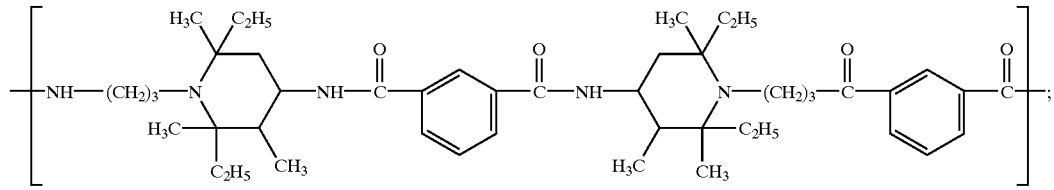
(XI)-3

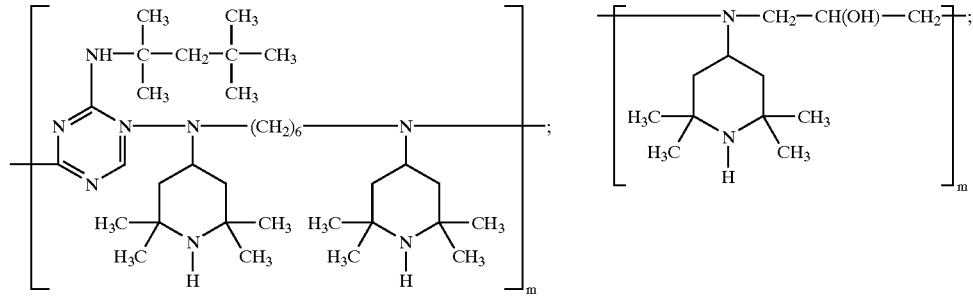
(XI)-4

(XI)-5

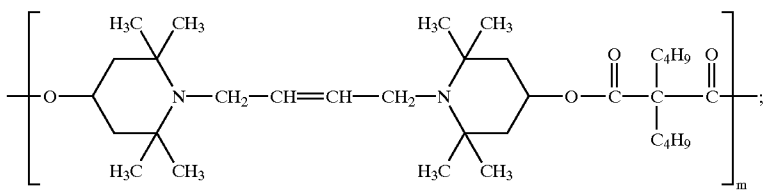
(XI)-6
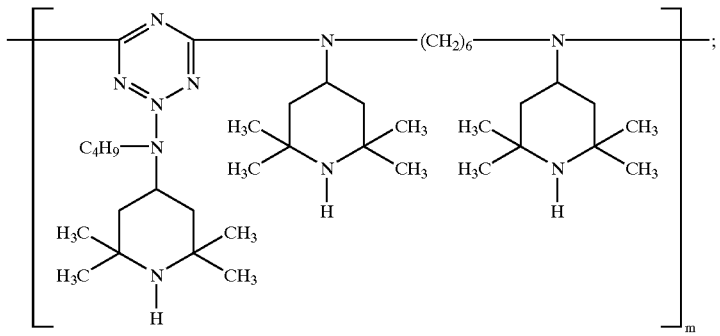
(XI)-7
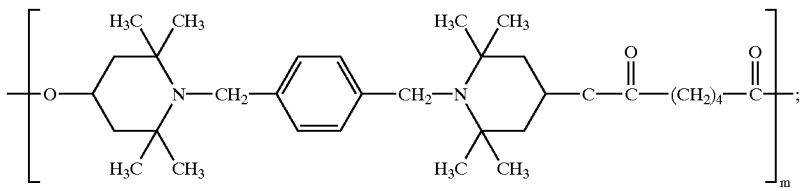
(XI)-8
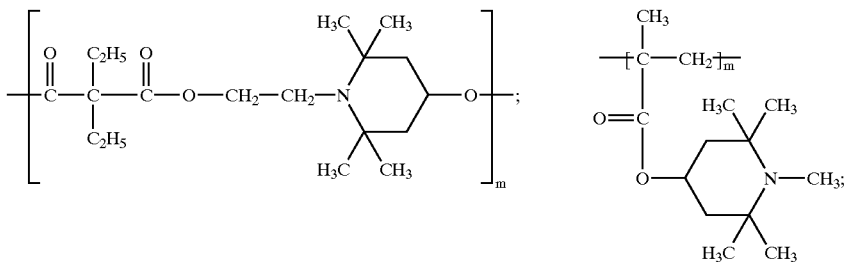
(XI)-9
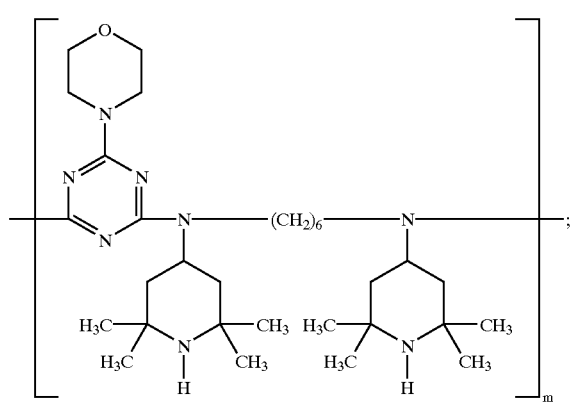
(XI)-10
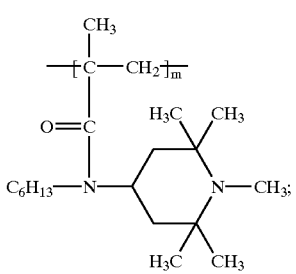
(XI)-11
(XI)-12

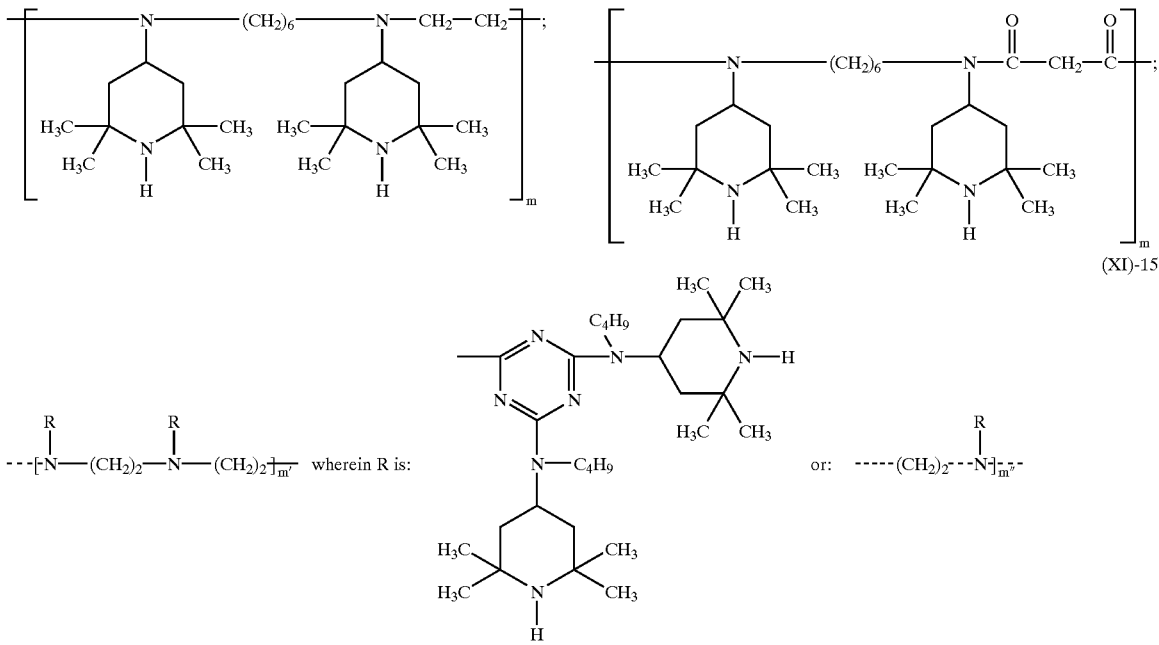

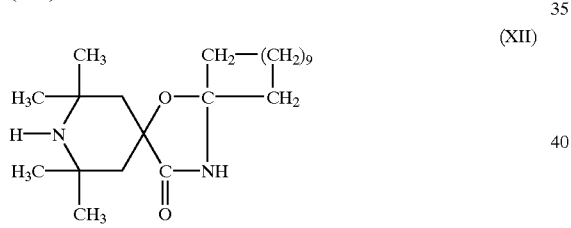 wherein R is:

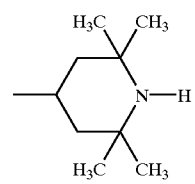 or: 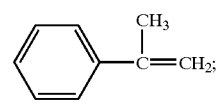

wherein m' and m" are an integer between 0 and 200 extremes included, on the condition that m'+m" is m.

Further examples of light stabilizers which can be used for the purpose are:

the reaction products between compounds having formula (XII):

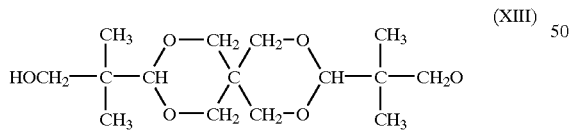

and epichlorohydrin;

polyesters obtained by the reaction of butane-1,2,3,4-tetracarboxylic acid with a bifunctional alcohol having formula (XIII):

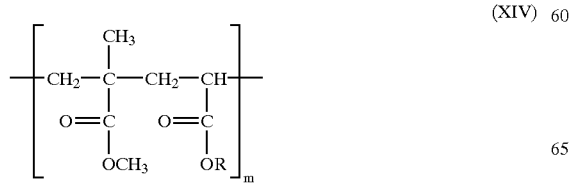

whose carboxylic termination generated by tetra-caboxylic acid has been esterified with a 2,2,-6,6-tetramethyl-4-hydroxypiperidine group;

compounds having general formula (XIV);

(XIV)

[structure with CH3, OCH3, OR groups]

wherein about a third of the R radicals represent a —$C_2H_5$ group and the remaining a group having the formula:

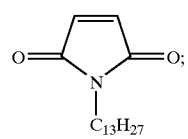

and m is a number between 2 and 200 extremes included;

copolymers whose recurrent unit consists of two units having the formula:

[styrene unit structure]

a unit having the formula:

[maleimide with $C_{13}H_{27}$]

and a unit having the formula:

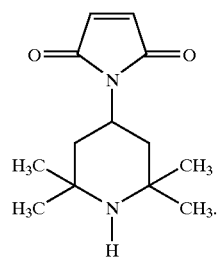

(g) Compounds having general formula (XVIII):

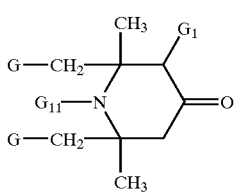

(XVIII)

wherein G, $G_1$ and $G_{11}$ have the same meanings described above under point (a). Compounds having general formula (XVIII) wherein G is hydrogen and $G_{11}$ is hydrogen or methyl, are preferably used.

Specific examples of compounds having general formula (XVIII) are:

2,2,6,6-tetramethyl-4-piperidone (triacetone-amine);
2,2,6,6-pentamethyl-4-piperidone;
2,3,6-trimethyl-2,6-diethyl-4-piperidone.

(h) Compounds having general formula (XIX):

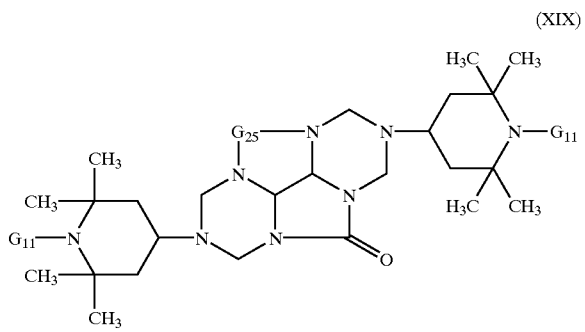

(XIX)

wherein $G_{11}$ has the same meanings described above under point (a) and $G_{25}$ is a direct bond, a methylene or preferably a carbonyl, as described in German patent application DE 3,530,666.

(i) Compounds having general formula (XX):

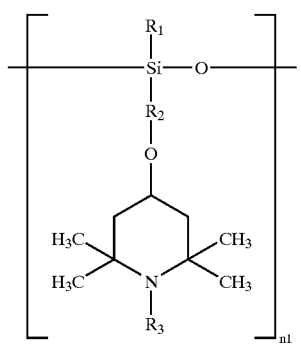

(XX)

wherein $R_1$ is a $C_1$–$C_{10}$ alkyl group, a $C_5$–$C_{12}$ cycloalkyl group optionally substituted with a $C_1$–$C_4$ alkyl group, a phenyl optionally substituted with a $C_1$–$C_{10}$ alkyl group; $R_2$ is a $C_3$–$C_{10}$ alkylene group; $R_3$ is a hydrogen, a $C_1$–$C_8$ alkyl group, $O^+$, a —$CH_2CN$ group, a $C_3$–$C_6$ alkenyl group, a $C_7$–$C_9$ phenylalkyl group optionally substituted in the phenyl radical with a $C_1$–$C_4$ alkyl group, a $C_1$–$C_8$ acyl group; and $n_1$ is a number between 1 and 50 extremes included.

Specific examples of compounds having general formula (XX) are:

(1) poly-methylpropyl-3-oxy-[4-(2,2,6,6-tetramethyl)-piperidinyl]siloxane, known under the trade-name of UVASIL 299 of Great Lakes;
(2) poly-methylpropyl-3-oxy-[4-(1,2,2,6,6-pentamethyl)-piperidinyl]siloxane.

The crystalline modification of the present invention can be combined, as specified above, with other conventional additives or their mixtures. These additives are added in a quantity ranging from about 0.1% to 5% by weight with respect to the weight of the films based on polyolefins or polyolefinic copolymers to be stabilized, preferably between 0.5% and about 3% by weight.

Examples of other conventional additives which can be used are: antioxidants (such as, for example, alkylated monophenols, alkylthiomethylphenols, hydroquinones and alkylated hydroquinones, tocopherols, hydroxylated thiophenyl ethers, alkylidene-bisphenols, benzyl compounds containing O, N or S, hydroxybenzylated malonates, aromatic hydroxybenzyl compounds, triazine compounds, benzylphosphonates, acylaminophenols, esters of β-(3,5-di-t-butyl-4-hydroxyphenyl)propionic acid with monohydric or polyhydric alcohols, esters of β-(5-t-butyl-4-hydroxyphenyl)propionic acid with monohydric or polyhydric alcohols, esters of β-(3,5-dicyclohexyl-4-hydroxyphenyl)propionic acid with monohydric or polyhydric alcohols, esters of (3,5-di-t-butyl-4-hydroxyphenyl)acetic acid with monohydric or polyhydric alcohols, amides of β-(3,5-di-t-butyl-4-hydroxyphenyl)-propionic acid; other ultraviolet-ray and light stabilizers (such as, for example, derivatives of 2-(2'-hydroxyphenyl) benzotriazoles, esters of benzoic acids, acrylates, oxamides, 2-(2-hydroxyphenyl)-1,3,5-triazine); "metal deactivators"; phosphites and phosphonites; agents capable of destroying peroxides; basic costabilizers, nucleating agents; fillers and reinforcing agents; other additives (such as, for example, plasticizers, emulsifying agents, pigments, optical brighteners, flame-retardants, antistatic agents, blowing agents, thiosynergizing agents); benzofuranones and indolinones.

The present invention also relates to a process for the stabilization of agricultural films based on polyolefins or polyolefinic copolymers, particularly useful for greenhouses, comprising the incorporation of the crystalline modification of the present invention into the polyolefins or polyolefinic copolymers subsequently transformed into the above films. Greenhouses covered with the above agricultural films are a further object of the present invention.

Some illustrative but non-limiting examples are provided hereunder for a better understanding of the present invention and for its embodiment.

EXAMPLE 1

2.5 kg of [2,2'-thiobis(4-octylphenolate)-n-butylamine Nickel II] in powder form and 2.5 kg of 2-hydroxy-4-n-octyloxybenzophenone in powder form, are mixed and subsequently fed to a Maris corotating twin-screw extruder 33/40 (screws with a diameter of 33 mm and a length of 40 diameters).

The operating conditions are the following:
Screw rate: 100 r.p.m.
Temperature of the nine extruder zones: 40/30/40/30/40/35/35/40/51° C.
Diameter of the die holes: 2.5 mm.
The product leaves the die in the form of a solid "spaghettol" which, after cooling with air at room temperature, is fragmented into granules having a diameter of 2.5 mm and a length ranging from 0.5 to 5 mm.

The product thus obtained has a melting range (in capillary) of 46° C.–188° C. and an X-Ray diffraction spectrum from powders indicated in FIG. 4.

EXAMPLE 2

Light Resistance of Polyethylene Films 500 g of low density polyethylene (Riblene FC20 of Polimeri Europa) are mixed with the following additives:

(A) a mixture of nickel-quencher (a) and benzophenone (b) powders in a ratio 1:1;

(B) granules obtained by extrusion as described in Example 1; at the following concentrations: 0.25%, 0.50% and 0.75% by weight.

Each mixture is charged into a 3Brabender PL2000 single-screw extruder with a diameter of 19 mm, a length about 25 times the diameter, equipped with a screw and nozzle of 2 mm.

The operating conditions are the following:

screw rate: 60 r.p.m.

temperature of the extruder: 190° C.-200° C.-220° C.-220° C.

The product leaves the die in the form of a solid "spaghetto" which, after cooling with water, is fragmented into granules.

The polymer granules obtained as described above, are extruded again using a Plasticizer operating at a temperature of 190° C.-200° C.-220° C.-220° C.-220° C., obtaining films having a thickness of 170 μm.

The films thus obtained are subjected to accelerated aging in a Xenon Arc Weatherometer (WOM) under the following operating conditions:

temperature of the black panel: 60° C.;

irradiation: 0.33 w/m² relative humidity: 50%.

The films are removed from the irradiation chamber at regular intervals and subjected to tensile stress, measuring the elongation at breaking which is obviously reduced during the period of exposure in the weatherometer.

t 50% was adopted as evaluation criterium of the properties of the additives, i.e. the exposure time of the films to radiation in the weathometer necessary for obtaining a 50% reduction n the original elongation at breaking.

Considering that the effectiveness of the light stabilizing additive used, at the same concentration, is in direct correlation with t 50%, FIG. 5 demonstrates that the crystalline modification of the present invention, gives polyethylene films a better stabilization with respect to the mixture of powders.

What is claimed is:

1. A crystalline form of a mixture comprising:

(a) a nickel-quencher having the chemical name [2,2'-thiobis(4-t-octyl-phenolate)-n-butylamine Nickel (II)], and the formula (I):

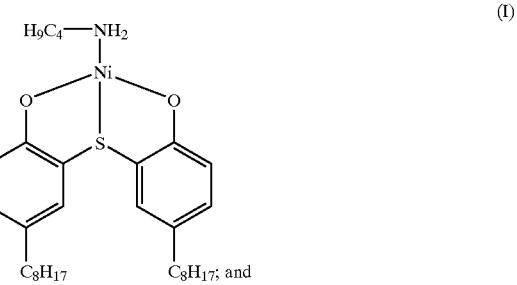

(b) a 2-hydroxy-4-alkyloxybenzophenone having the chemical name 2-hydroxy-4-n-octyloxybenzophenone, and the formula (II):

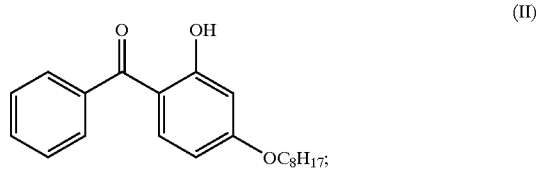

characterized in that said mixture has two diffraction lines at angles 2θ=6.291 and 2θ=6.888 in the X-Ray diffraction spectrum determined from a sample in powder form.

2. The crystalline form of a mixture according to claim 1, wherein said nickel-quencher (a) having formula (I) and said benzophenone (b) having formula (II), are used in a ratio ranging from 0.4 to 3.

3. The crystalline form of a mixture according to claim 2, wherein said nickel-quencher (a) having formula (I) and said benzophenone (b) having formula (II), are used in a ratio ranging form 1 to 2.

4. A process for the preparation of the crystalline form of a mixture according to any of the previous claims, comprising the extrusion of a mixture of said components (a) and (b) in powder form operating at such a temperature that only a small part of said benzophenone (b), having a melting point of 47° C.–50°, melts and dissolves only a small part of said nickel-quencher (a), having a melting point of 260°, obtaining a solid "spaghetto".

5. The process according to claim 4, wherein the solid "spaghetto", after appropriate cooling, is granulated by cutting at the head of the extruder or by subsequent fragmentation.

6. Agricultural films based on polyolefins or polyolefinic copolymers, containing said crystalline form of a mixture according to claims 1, 2 or 3 in a quantity sufficient to achieve light stabilization.

7. The agricultural films according to claim 6, wherein any of the oxides or hydroxides of zinc, aluminum or calcium, magnesium oxide, salts of alkaline earth metals, zinc salts and aluminum salts of a $C_1$–$C_{30}$ carboxylic acid, hydrotalcites, and sterically hindered amines, are present.

8. A process for the stabilization of agricultural films based on polyolefins or polyolefinic copolymers, comprising the incorporation of the crystalline form of the mixture according to any of the claims from 1 to 3, into the polyolefins or polyolefinic copolymers subsequently transformed into the above films.

9. Greenhouses covered with the agricultural films according to claim 6.

* * * * *